US006440536B1

(12) United States Patent
Ogura

(10) Patent No.: US 6,440,536 B1
(45) Date of Patent: Aug. 27, 2002

(54) TRANSFER MATERIAL AND IMAGE FORMING METHOD

(75) Inventor: Motohiro Ogura, Odawara (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/154,148

(22) Filed: Sep. 17, 1998

(30) Foreign Application Priority Data

Sep. 18, 1997 (JP) .......................................... 9-270335
Aug. 26, 1998 (JP) .......................................... 10-240250

(51) Int. Cl.[7] .......................................... B32B 27/14
(52) U.S. Cl. .......................................... 428/195
(58) Field of Search .......................................... 428/192, 220, 428/332, 195; 399/311–317

(56) References Cited

U.S. PATENT DOCUMENTS 4,420,528 A * 12/1983 Okiyama .................... 428/220
4,542,059 A * 9/1985 Toganoh et al. ............ 428/141
5,733,642 A 3/1998 Ogura et al. ................ 428/211
5,965,243 A * 10/1999 Butler et al. ................ 428/195

FOREIGN PATENT DOCUMENTS

| | | | |
|---|---|---|---|
| EP | 0958865 | * 11/1999 | ............ B05D/5/04 |
| JP | 34734 | 9/1976 | |
| JP | 202065 | 8/1996 | |
| WO | WO98/32542 | * 7/1998 | ............ B05D/5/04 |

OTHER PUBLICATIONS

Japanese Industrial Standard JIS B 0601 (1982) pp1–12, "Definitions and Designation of Surface Roughness" published by Japanese Standards Association.

* cited by examiner

*Primary Examiner*—Bruce H. Hess
*Assistant Examiner*—Michael E. Grendzynski
(74) *Attorney, Agent, or Firm*—Fitzpatrick, Cella, Harper & Scinto

(57) ABSTRACT

This invention relates to a transfer material for receiving electrostatic transfer of an image on an image bearing member, comprising a resinous material and having a surface coarseness Rz of 10 μm or higher on lateral faces, and an image forming method thereto.

22 Claims, 4 Drawing Sheets

TRANSFER MATERIAL AND IMAGE FORMING METHOD

BACKGROUND OF THE INVENTION

1. Field of the Invention

The present invention relates to a transfer material on which an image is transferred from an image bearing member, for example in an electrophotographic apparatus, and an image forming method for such transfer material.

2. Related Background Art

The conventional electrophotographic apparatus employs charged resin particles, called "toner", for image formation and obtains a permanent image by developing an electrostatic latent image formed on a photosensitive member with such toner. Then, the thus obtained toner image is transferred onto a transfer material such as paper or film employing an electrostatic field formed by a transfer charger such as a corona charger or a roller charger. The toner image is fixed to the transfer material by applying heat and pressure to the transfer material bearing the transferred toner image.

Therefore, for forming a clear image on the transfer material composed, for example, of a polymer plastic film, it is necessary to apply the above-mentioned electrostatic field in a uniform and efficient manner. For this purpose, the film conventionally used as the transfer material is subjected to an antistatic treatment in order to prevent electrostatic charging-up. Such antistatic treatment of the film is defined by the surface resistivity thereof in the monochromatic copying apparatus. For example, Japanese Patent Publication No. 51-34734 teaches that the appropriate range of the specific surface resistivity of the film subjected to antistatic treatment is $10^6$ to $10^{16}$ Ω/□.

Such antistatic treatment also prevents frictional charging of the transfer material, consisting of a polymer film, by contact with other members before it is used for image transfer, thereby avoiding sheet jamming resulting from the electrostatic adhesion of the charged transfer material to other members of the sheet transport path due to charge-up of the transfer material.

However, the transfer material consisting of a polymer film or resin-impregnated paper (paper fibers appear on the paper surface) has a higher electrical resistance in comparison with ordinary paper. In case of color image formation in a multi-color electrophotographic apparatus with such transfer material, the charging which occurs at the transfer of the image of the first color induces uneven charge on the transfer material, which results in an uneven transfer of the images of the second and subsequent colors, or raises a static charge-up due to increase of the surface potential of the transfer material. Accordingly, it becomes difficult to transfer the images of plural colors onto the transfer material.

For avoiding such phenomenon, the specific surface resistivity on both faces of the transfer material is preferably maintained within a range of $10^6$ to $10^{10}$ Ω/□ under any environmental condition from a low humidity condition to a high humidity condition. An excessively low surface resistivity below $10^6$ Ω/□ cannot provide an electrostatic field required for image transfer since the charge induced by the transfer charger escapes, while a surface resistivity exceeding $10^{10}$ Ω/□ tends to lead to the charging-up of the sheet mentioned above.

However, even when the specific surface resistivity of the transfer materials is maintained within the range of $10^6$ to $10^{10}$ Ω/□ by antistatic treatment, conducting image formation with such transfer material generates a line-shaped electrostatic latent image in a portion corresponding to the end of the transfer material, thereby causing a linear image defect in the image formed next.

Particularly, in the image forming apparatus of a system in which the photosensitive member charged to a predetermined polarity is subjected to image exposure with a laser beam and is developed with toner of a charging polarity the same as the above-mentioned predetermined polarity (reversal developing method) to obtain a toner image, as in the recent digital copying machine, the charge given to the transfer material by the transfer charger is of a polarity opposite to the above-mentioned predetermined polarity. Therefore, the photosensitive member is charged in a polarity opposite to the above-mentioned predetermined polarity, and the above-described line-shaped electrostatic latent image cannot be eliminated by simple charge eliminating means.

In order to avoid generation of such line-shaped electrostatic latent image on the surface of the photosensitive member corresponding to the end of the transfer material, the Japanese Patent Laid-Open Application No. 8-202065 discloses a transfer material having different composition on both faces, with a specific surface resistivity of $10^{11}$ Ω/□ or more in at least edge portions of at least one of the faces.

However, even if the specific surface resistivity is made equal to $10^{11}$ Ω/□ or higher, the transfer material is susceptible to the influence of humidity in case it is resin-impregnated paper or antistatically treated film, so the specific surface resistivity tends to become lower than $10^{11}$ Ω/□ even the transfer material is cautiously treated to avoid moisture absorption. For this reason, the formation of the remnant line-shaped electrostatic latent image on the photosensitive member is often unavoidable, thereby leading to the line-shaped image defect on the image obtained next.

SUMMARY OF THE INVENTION

The object of the present invention is to provide a transfer material capable of preventing formation of an electrostatic latent image at a portion of the image bearing member corresponding to an end portion of the transfer material.

Other objects of the present invention will become fully apparent from the following detailed description, which is to be taken in conjunction with the attached drawings.

DETAILED DESCRIPTION OF THE PREFERRED EMBODIMENTS

Now the present invention will be clarified in detail by the following description with reference to the attached drawings.

Figure 1A:
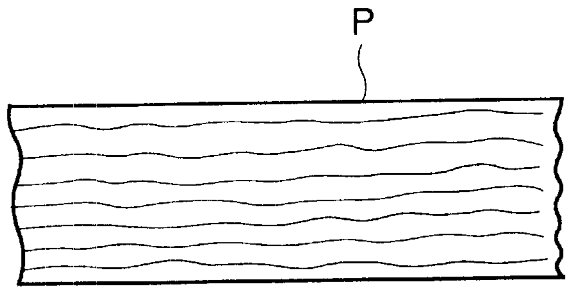
FIGS. 1A, 1B and 1C are views showing a transfer material embodying the present invention.
Figure 1B:
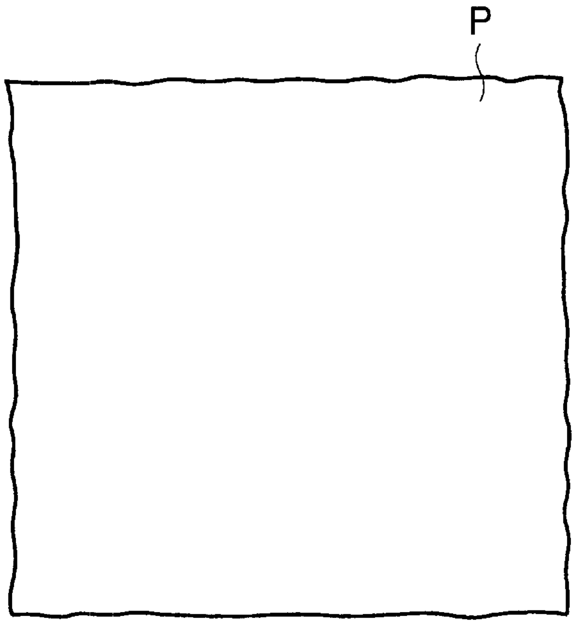
Figure 1C:
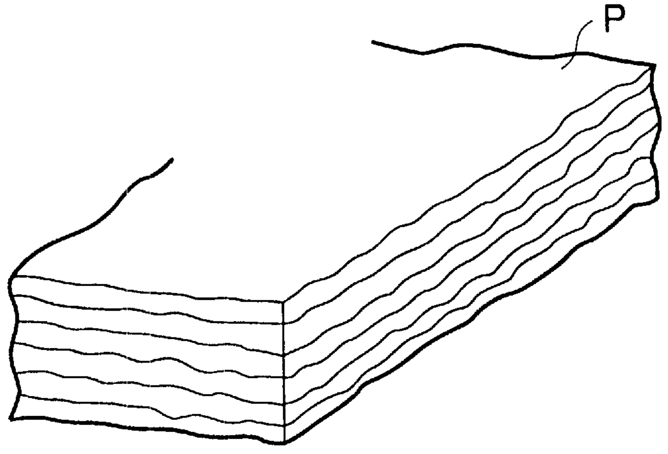

FIGS. 1A, 1B and 1C are respectively a cross-sectional view, a plan view and a perspective view showing a transfer material embodying the present invention.

The transfer material P of the present invention is composed for example of resin-impregnated paper or antistatically treated film (such as OHP film), of which four peripheral ends or four lateral faces, are made coarse by polishing as shown in FIGS. 1A to 1C.

In order to prevent, at the image transfer in the image formation utilizing the transfer material such as resin-impregnated paper of antistatically treated film (for example OHP film), generation of the aforementioned line-shaped electrostatic latent image on the surface of the photosensitive drum corresponding to end portions of the transfer material, the present inventor has investigated the cause of such phenomenon. As a result, it has been revealed that such transfer material has a sharp edge at the end or lateral face, whereby, at the image transfer, the electrostatic (transfer) field is concentrated on such end portion of the transfer material to induce formation of abnormal charge in the corresponding surface portion of the photosensitive drum which generates abnormal charging to form a line-shaped electrostatic latent image on the surface of the photosensitive drum.

Consequently, in the present invention, the surface coarseness of the lateral face of the transfer material P is controlled by polishing. According to the investigation of the present inventor, the surface coarseness Rz, defined by JIS B0601, of the lateral face should be made equal to or larger than 10 $\mu$m, in order to avoid concentration of the transfer electric field to the end of the transfer material. With a surface coarseness Rz less than 10 $\mu$m at the lateral face of the transfer material P, the lateral face still forms a sharp edge, so that there cannot be prevented injection of abnormal charge into the surface of the photosensitive drum, corresponding to the end portion of the transfer material, resulting from the concentration of the transfer electric field to such end portion. Consequently, there cannot be sufficiently prevented the formation of line-shaped latent image, resulting from abnormal charging of the surface of the photosensitive drum. On the other hand, a surface coarseness Rz exceeding 30 $\mu$m results in formation of paper dusts, thus leading to defects in the image formation. Consequently, a surface coarseness Rz not exceeding 30 $\mu$m is preferred.

The polishing of the lateral faces of the transfer material can be achieved with sandpaper as the polishing material. A sandpaper of a coarseness not exceeding #600 is suitable for polishing the lateral faces of the transfer material P to a surface coarseness Rz of 10 $\mu$m or higher. The polishing can be achieved by stacking a plurality, for example 20 to 50 sheets, of the transfer materials P and manually rubbing the lateral face of the stacked transfer materials in the longitudinal direction. The number of rubbing can be about 10 reciprocating motions for each lateral face, but it can be larger or smaller it. Also there may be employed a mechanical polishing method, for achieving more efficient polishing.

In the present invention, the lateral faces of the transfer material P are so polished as to have the surface coarseness Rz of 10 $\mu$m or higher as defined by JIS B0601, and such surface coarseness can be conveniently measured for example with the non-contact surface coarseness meter SE-3400 manufactured by Kosaka Kenkyusho.

Figure 2A:
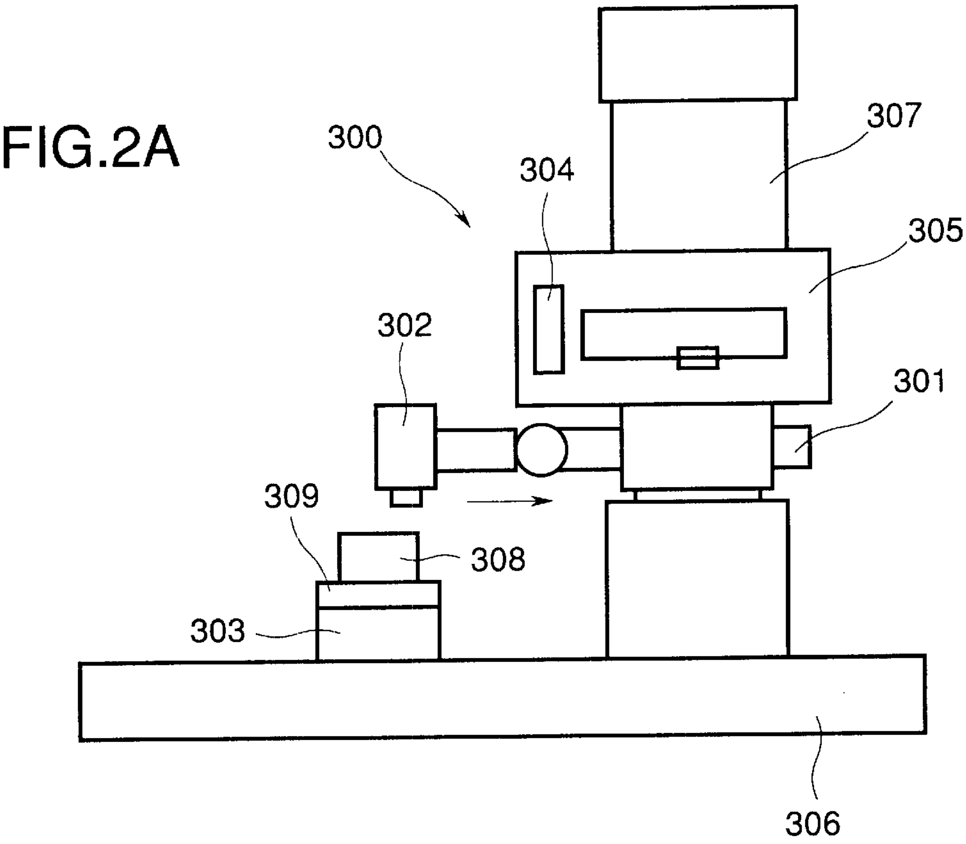
FIGS. 2A and 2B are views showing a non-contact surface coarse (roughness) meter for measuring the surface coarseness Rz of the lateral face of the transfer material of the present invention and a method of use thereof.

As shown in FIG. 2A, the surface coarseness meter 300 is provided with an arm 301 bearing a non-contact sensor 302 at the end thereof, and the arm 301 is mounted by a driving unit 305 on a pillar 307 fixed on a base member 306, whereby the sensor 302 at the end of the arm 301 can be moved in the vertical and horizontal directions by the driving unit 305. Opposed to the sensor 302 which is on the extension of the axis of the arm 301, there is provided a specimen table 303 on the base member 306. On the specimen table 303, there is provided a clamp 309 for fixing a paper specimen 308 in such a manner that the longitudinal face thereof coincides with a vertical plane containing the axis of the arm 301.

Figure 2B:
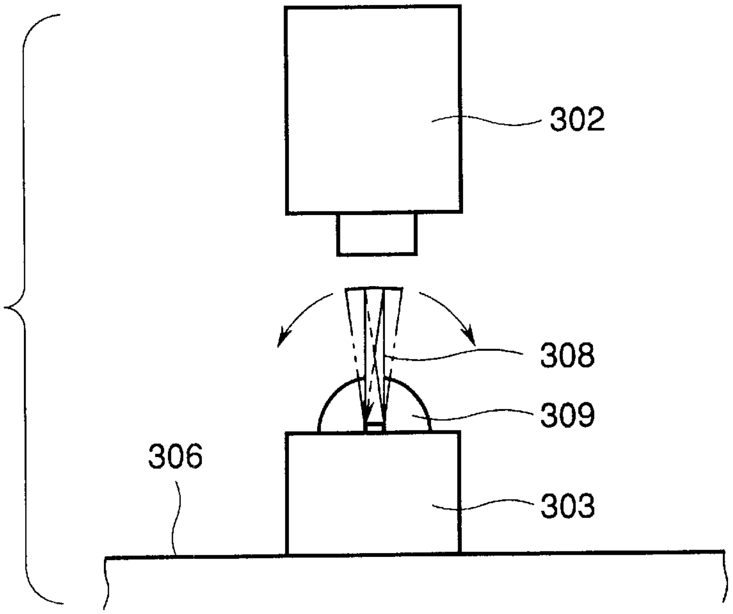

The paper specimen 308 is obtained, after polishing of the transfer material P, by cutting it in a rectangle of a size of about 20×20 mm including a lateral face to be measured, and at least four specimens are prepared from a transfer material P, corresponding to the four lateral faces of the transfer material P. Each paper specimen 308 is fixed by the clamp 309, with the lateral face to be measured being positioned upwards. Then, the driving unit 305 is activated to adjust the height of the sensor 302 relative to the specimen 308 and to position the sensor 302 above the front end of the specimen 308. Then, as shown in FIG. 2B, the driving unit 305 is set at the automatic feeding to scan the paper specimen 308 to the rear end thereof as indicated by an arrow in FIG. 2A, thereby measuring the surface coarseness Rz of the upper lateral face of the paper specimen 308 plural times, while the angle of the paper specimen 308 at the upper side thereof is changed slightly each time as shown in FIG. 2B. The results of measurement are displayed on a set meter 304 provided on the driving unit 305, and the smallest value of the surface coarseness Rz among the plural measurements is read. The surface coarseness Rz is within the scope of the present invention if the minimum value thereof is at least equal to 10 $\mu$m.

Figure 3:
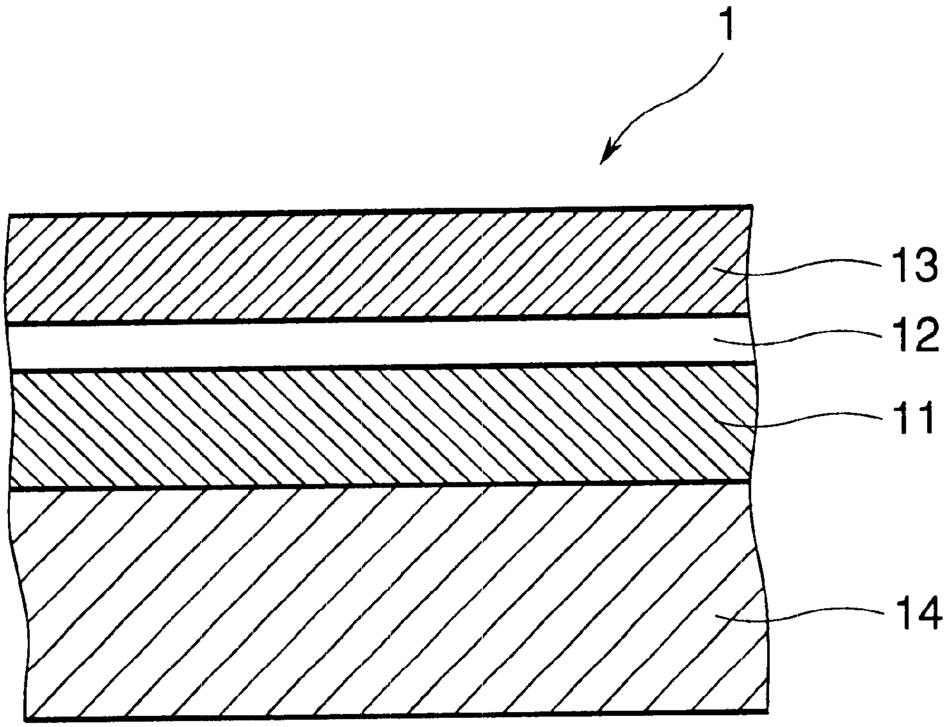
FIG. 3 is a view showing the layered configuration of the transfer material of the present invention.

FIG. 3 shows an example of the layered structure of the above-described transfer material P (impregnated paper). This transfer material P can be advantageously employed for an image re-transfer process to be explained later.

A base material 11 of the transfer material P is composed of medium or fine quality ordinary paper with a preferred weight of 30 to 200 g/m$^2$, more preferably 45 to 150 g/m$^2$.

A releasing layer 12 is composed of a material of a larger surfacial energy in comparison with that of a transfer layer 13, in order to leave the transfer layer 13 on a re-transfer medium in a re-transfer step. For example, silicone system resin, fluoride system resin is suitable therefor.

The transfer layer 13 is composed of a preferably highly crosslinked resinous material resistant to the influence of humidity and free from drawbacks in the image transfer under various environmental conditions. Examples of such material include vinylic resin, polyurethane resin, epoxy resin and polyamide resin.

A filler layer 14 may be provided on the rear surface of the base material. Such filler layer is advantageously by silk screen coating, in consideration of the ease of formation of a patterned filler layer, since the paper completely covered with the filler layer will result in insufficient portability in the electrophotographic apparatus 200 (FIG. 4).

For this reason, the paper is advantageously not completely covered, in order to allow entry of some moisture into the paper. The filler resin is made to penetrate into the paper, in order to improve the transportability of paper at the coating step. However, different resins are preferably employed on the top side and the bottom side of the transfer material for the image re-transfer process, since the stacked transfer materials may be transported in superposed state if a same resin is utilized on both sides.

The filler resin is preferably of satisfactory penetrability into paper, a low viscosity and a satisfactory stability against the influence of moisture. Examples of such resin include thermoplastic resins such as acrylic or vinylic resin, and thermosetting resins such as phenolic, urea, melamine, alkyd, epoxy or urethane resin. A material forming a coarse surface, such as silica or clay, may be added for preventing insufficient sheet fetching by the rollers in the fixing unit.

Figure 4:
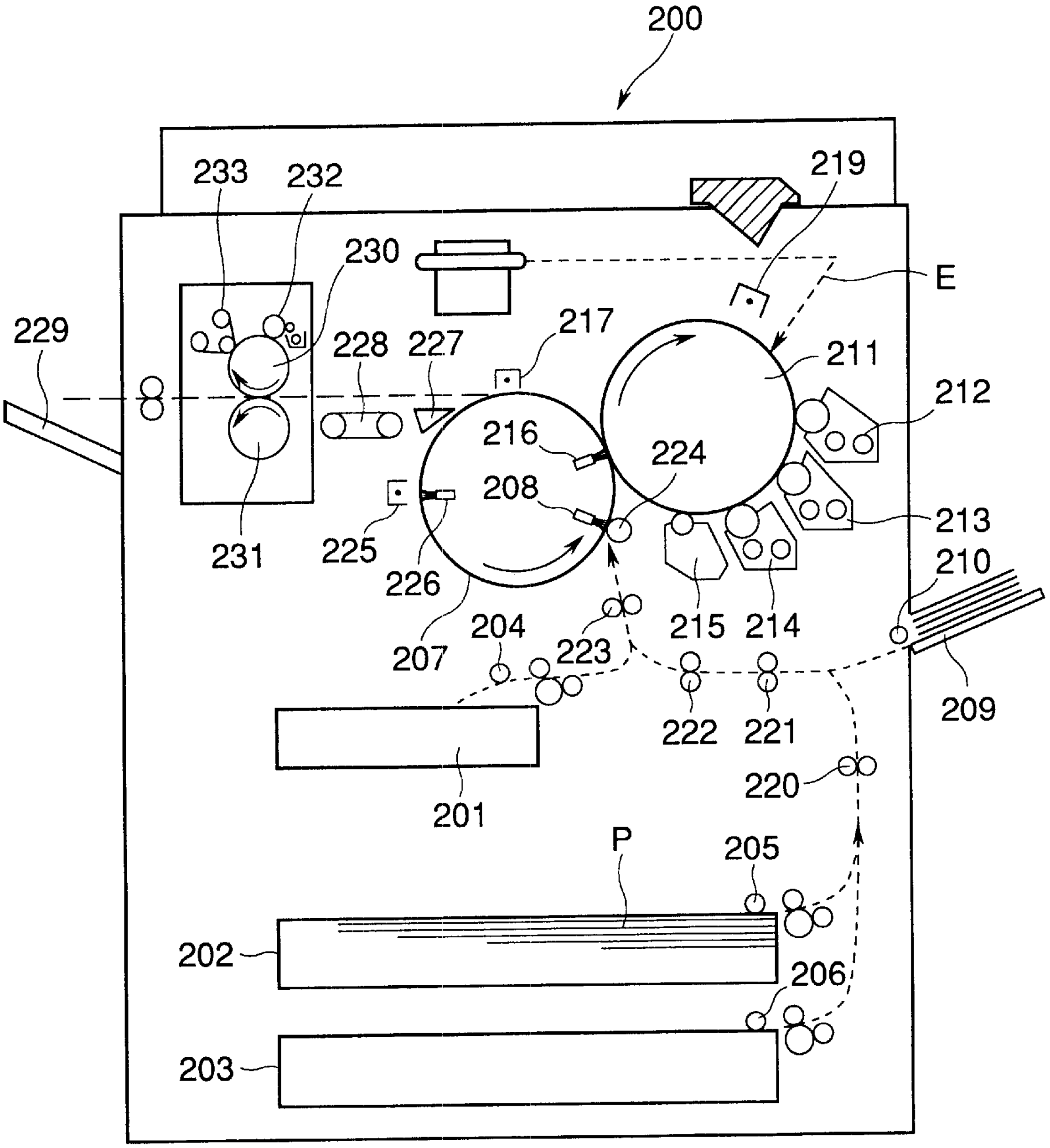
FIG. 4 is a view showing an electrophotographic apparatus for effecting image formation on the transfer material of the present invention.

FIG. 4 shows an example of the image forming apparatus for forming an image on the transfer material of the present invention.

The image forming apparatus 200 is provided, around a photosensitive drum 211 constituting an image bearing member, with a yellow developing unit 212, a magenta developing unit 213, a cyan developing unit 214 and a black developing unit 215 which are detachable from the main body of the apparatus, and further with a transfer drum 207 constituting a transfer material bearing member on which a transfer material P such as a film is electrostatically wound therearound, a primary charger 219 and an image exposure system E for forming a desired electrostatic latent image on the photosensitive drum 211. The surface of the photosensitive drum 211 is uniformly charged negatively by the primary charger 219 and is then subjected to image exposure.

The image forming apparatus 200 is capable of forming a monochromatic image or a multi-color (full-color) image on the transfer material P.

In case of forming a full-color image, the transfer material P pulled out from a paper tray 202 is guided by a paper feed roller 205 etc. in a direction indicated by an arrow, is then transported to the transfer drum 207 by transport drums 220, 221, 222 and 223 and is wound on the transfer drum 207 by electrostatic adhesion caused by an adhesion brush 208 and an adhesion roller 224. Subsequently, toner images of different colors are in succession transferred from the photosensitive drum 211 onto the transfer material P on the transfer drum 207, according to the image forming process.

The image transfer is executed by a transfer brush 216 constituting the transfer means. More specifically, the transfer brush 216 is contacted with the rear face of the transfer drum 207 composed of a dielectric sheet such as of PVDF (polyvinylidene fluoride) to provide the rear face of the transfer drum 207 with a charge of a (positive) polarity opposite to the charged polarity of the toner. An electrostatic field (transfer electric field) generated by thus provided charge attracts the toner image from the photosensitive drum 211 to the transfer material P, thus causing transfer of the toner image thereon.

Such image transfer is repeated for the toner images of magenta (M), cyan (C), yellow (Y) and black (K) formed in succession on the photosensitive drum 211, whereby the toner images of four colors from magenta to black are superposed on the transfer material P. The transfer material P bearing thus transferred toner images of four colors is then supplied to a fixing unit 218 constituting the fixing means, and the toner images of different colors are fused, and mixed to be fixed on the transfer material P during the passing through the fixing unit.

A transfer material transport system is provided with transfer material trays 201, 202 and 203 positioned in the lower part of the apparatus 200, sheet feeding rollers 204, 205 and 206 positioned approximately thereon, and transport rollers 220, 221, 222 and 223 positioned close to the feed rollers 204, 205 and 206. There are also provided an adhesion roller 224, a separation charger 217 and a charge eliminating charger 225 in the vicinity of the external periphery of the transfer drum 207, an adhesion brush 208, a transfer brush 216 and a charge eliminating brush 226 in the interior of the transfer drum 207, and a separating finger

227 positioned between the separating charger 217 and the charge eliminating charger 225 and close to the transfer drum 207. A conveyor belt 228 is positioned close to the separating finger 227, while a thermal fixing unit 218 is provided at the end of the conveyor belt 228 in the conveying direction thereof, and a discharge tray 229 detachable from the apparatus 200 is provided on the extension of the exit of the fixing unit 218 so as to protrude to the exterior of the apparatus 200.

The fixing unit 218 is provided with a heating roller 230 having a heater therein, a pressure roller 231 opposed to the heating roller 230, a releasing agent application unit 232 for applying a releasing agent such as silicone oil to the heating roller 230, and a cleaning device 233 for the heating roller 230.

After the toner image is formed (fixed) on the transfer material P in the above-described electrophotographic apparatus 200, the transfer material P is aligned on a re-transfer medium (such as cloth) in such a manner that the toner image is opposed thereto and is heated to a temperature inducing softening of the toner and the transfer layer 13 of the transfer material P, under pressurization. Thereafter the transfer material P is cooled, and the releasing layer 12 and the underlying structure are peeled off, leaving the transfer layer 13 on the re-transfer medium to achieve re-transfer of the image. This process allows transfer of the image onto various materials such as cloth.

In the following there will be explained examples or embodiments of the present invention.

EXAMPLE 1

Impregnated paper was prepared by impregnating fine-grade paper of a weight of 157 g/m$^2$ with water-soluble acrylic resin, and the transfer material was prepared by manually polishing, with sandpaper, of lateral faces of a stack of 50 sheets of such impregnated paper. The sandpaper employed had a coarseness of #400, and the polishing was achieved by 10 reciprocating cycles per each lateral face.

After the polishing, the paper dust generated by polishing was sucked away with a vacuum cleaner from the end faces of the transfer material. The lateral faces of the transfer material had a surface coarseness Rz of 12 $\mu$m, when measured with the non-contact surface coarseness meter 300 described in the foregoing.

A predetermined number (for example 10 sheets) of thus prepared transfer materials were successively passed for image formation in the electrophotographic apparatus 200 shown in FIG. 3, under a high humidity condition of 27.5° C./75%RH, and then a plain paper larger than the transfer material (for example A3 size if the transfer material is A4 size) was passed and subjected to image formation for checking whether a defect resulting from the line-shaped electrostatic latent image on the photosensitive drum was formed on the image. Such line-shaped image defect was not observed.

EXAMPLE 2

A transfer material was prepared in the same manner as in the example 1, except for employing a PET (polyethylene terephthalate) film of a weight of 100 g/m$^2$ of which electrical resistance was adjusted with a quaternary ammonium salt. Measurement with the non-contact surface coarseness meter 300 in a similar manner revealed that the lateral faces of the transfer material had a surface coarseness Rz of 14 $\mu$m.

A predetermined number (for example 10 sheets) of thus prepared transfer materials were successively passed for image formation in the electrophotographic apparatus 200, under a high humidity condition of 27.5° C./75%RH, and then a plain paper larger than the transfer material (for example A3 size if the transfer material is A4 size) was passed and subjected to image formation, but there was not observed the line-shaped image defect resulting from the line-shaped electrostatic latent image on the photosensitive drum.

EXAMPLE 3

A transfer material was prepared in the same manner as in the example 1, except for employing a coated paper of a weight of 157 g/m$^2$. Measurement with the non-contact surface coarseness meter 300 in a similar manner revealed that the lateral faces of the transfer material had a surface coarseness Rz of 12 $\mu$m.

A predetermined number (for example 10 sheets) of thus prepared transfer materials were successively passed for image formation in the electrophotographic apparatus 200, under a high humidity condition of 27.5° C./75%RH, and then a plain paper larger than the transfer material (for example A3 size if the transfer material is A4 size) was passed and subjected to image formation, but there was not observed the line-shaped defect on the image.

Reference or Comparative Example 1

The impregnated paper of the example 1, without polishing, was employed as the transfer material. Measurement with the non-contact surface coarseness meter 300 in a similar manner revealed that the lateral faces of the transfer material had a surface coarseness Rz of 5 $\mu$m.

A predetermined number (for example 10 sheets) of thus prepared transfer materials were successively passed for image formation in the electrophotographic apparatus 200, under a high humidity condition of 27.5° C./75%RH, and then a plain paper larger than the transfer material (for example A3 size if the transfer material is A4 size) was passed and subjected to image formation. There was observed a line-shaped image defect resulting from the line-shaped electrostatic latent image on the photosensitive drum.

Reference Example 2

The PET film subjected to resistance adjustment with the quaternary ammonium salt in the example 2 was employed, without polishing, as the transfer material. Measurement with the non-contact surface coarseness meter 300 in a similar manner revealed that the lateral faces of the transfer material had a surface coarseness Rz of 4 $\mu$m.

A predetermined number (for example 10 sheets) of thus prepared transfer materials were successively passed for image formation in the electrophotographic apparatus 200, under a high humidity condition of 27.5° C/75%RH, and then a plain paper larger than the transfer material (for example A3 size if the transfer material is A4 size) was passed and subjected to image formation. There was observed a line-shaped image defect resulting from the line-shaped electrostatic latent image on the photosensitive drum.

Reference Example 3

The coated paper of the example 3, was employed, without polishing, as the transfer material. Measurement with the non-contact surface coarseness meter 300 in a similar manner revealed that the lateral faces of the transfer material had a surface coarseness Rz of 5 $\mu$m.

A predetermined number (for example 10 sheets) of thus prepared transfer materials were successively passed for image formation in the electrophotographic apparatus 200, under a high humidity condition of 27.5° C./75%RH, and then a plain paper larger than the transfer material (for example A3 size if the transfer material is A4 size) was passed and subjected to image formation. There was observed a line-shaped image defect resulting from the line-shaped electrostatic latent image on the photosensitive drum.

Reference Example 4

The transfer material was prepared in the same manner as in the example 1, except for employing sandpaper of a coarseness of #800 for polishing the impregnated paper. Measurement with the non-contact surface coarseness meter 300 in a similar manner revealed that the lateral faces of the transfer material had a surface coarseness Rz of 8 $\mu$m.

A predetermined number (for example 10 sheets) of thus prepared transfer materials were successively passed for image formation in the electrophotographic apparatus 200, under a high humidity condition of 27.5° C./75%RH, and then a plain paper larger than the transfer material (for example A3 size if the transfer material is A4 size) was passed and subjected to image formation. There was observed a line-shaped image defect resulting from the line-shaped electrostatic latent image on the photosensitive drum.

What is claimed is:

1. An image receiving material comprising:

a resin layer for receiving thereon an image from an image bearing member;

a base layer serving as a substrate; and a releasing layer provided between said resin layer and said base layer for facilitating a separation of said resin layer and said base layer, wherein a surface roughness Rz of side surfaces of said image receiving material substantially perpendicular to an image receiving surface of said image receiving material is 10 $\mu$m or higher.

2. An image receiving material according to claim 1, wherein the base layer includes paper.

3. An image receiving material according to claim 2, wherein a surface of the paper opposite to the releasing layer is impregnated with a resin.

4. An image receiving material according to claim 3, wherein a resin of the resin layer is different from the resin of the base layer.

5. An image receiving material according to claim 2, wherein the paper has a basis weight of 30 to 200 g/m$^2$.

6. An image receiving material according to claim 5, wherein a surface of the paper opposite to the releasing layer is impregnated with a resin.

7. An image receiving material according to claim 6, wherein a resin of the resin layer is different from the resin of the base layer.

8. An image receiving material according to claim 2, wherein the paper has a basis weight of 45 to 150 g/m$^2$.

9. An image receiving material according to claim 8, wherein a surface of the paper opposite to the releasing layer is impregnated with a resin.

10. An image receiving material according to claim 9, wherein a resin of the resin layer is different from the resin of the base layer.

11. An image receiving material according to claim 1, wherein the image bearing member is a photosensitive member for an electrophotographic apparatus.

12. An image forming method on an image receiving material comprising the steps of:

forming an image on an image bearing member; and electrostatically transferring the image on said image bearing member onto an image receiving material;

wherein said image receiving material comprises a resin layer for receiving thereon an image from the image bearing member, a base layer serving as a substrate; and a releasing layer provided between said resin layer and said base layer for facilitating a separation of said resin layer and said base layer, wherein a surface roughness Rz of side surfaces of said image receiving material substantially perpendicular to an image receiving surface of said image receiving material is 10 $\mu$m or higher.

13. An image forming method according to claim 12, wherein said surface roughness Rz of said side surfaces does not exceed 30 $\mu$m.

14. An image forming method according to claim 12, wherein said image receiving material is a film for OHP.

15. An image forming method according to claim 12, wherein said image receiving material has a basis weight of 100 g/m$^2$ or higher.

16. An image forming method according to claim 12, wherein said side surfaces are polished with a sandpaper of a roughness smaller than #600.

17. An image forming method according to claim 12, wherein said image receiving material is composed of a paper as the base layer impregnated with the resin.

18. An image forming method according to claim 12, wherein, after the transfer of the image from the image bearing member to the image receiving material, the image is fixed on the image receiving material by fixing means and the fixed image on the image receiving material is transferred onto a second image receiving material.

19. An image forming method according to claim 12, wherein the image is formed with toner on said image bearing member and a charging polarity of said image bearing member is the same as a charging polarity of the toner.

20. An image forming method according to claim 19, wherein the image on said image bearing member is electrostatically transferred onto the image receiving material by transfer means.

21. An image forming method according to claim 20, wherein said image bearing member bears images of plural colors and transferring said images of plural color in succession and in superposed manner by said transfer means onto the image receiving material supported by an image receiving material supporting member.

22. An image forming method according to any one of claims 12 to 21, wherein said image bearing member is an electrophotographic photosensitive member.

* * * * *

UNITED STATES PATENT AND TRADEMARK OFFICE

CERTIFICATE OF CORRECTION

PATENT NO. : 6,440,536 B1

DATED : August 27, 2002

INVENTOR(S) : Motohiro Ogura

It is certified that error appears in the above-identified patent and that said Letters Patent is hereby corrected as shown below:

Title page,
Item [56], FOREIGN PATENT DOCUMENTS,
"JP 34734 9/1976" should read -- JP 51-34734 9/1976 --; and
"JP 202065 8/1996" should read -- JP 8-202065 8/1996 --.

Column 10,
Line 4, "claim 12," should read -- claim 17, --.

Signed and Sealed this

Twenty-fifth Day of February, 2003

JAMES E. ROGAN

*Director of the United States Patent and Trademark Office*